Jan. 12, 1954 W. E. BRILL 2,665,955
CRANKSHAFT THRUST BEARING OIL SEAL
Filed Dec. 20, 1951 2 Sheets-Sheet 1

INVENTOR.
William E. Brill
BY
Willits, Helwig & Baillio
ATTORNEYS

Patented Jan. 12, 1954

2,665,955

UNITED STATES PATENT OFFICE 2,665,955

CRANKSHAFT THRUST BEARING OIL SEAL

William E. Brill, Cleveland, Ohio, assignor to General Motors Corporation, Detroit, Mich., a corporation of Delaware Application December 20, 1951, Serial No. 262,538

8 Claims. (Cl. 308—36.1)

This invention relates to shaft sealing, and particularly to the sealing of vertical driving or driven shafts against escape of lubricating oil or other liquid therealong from a bearing or other device through which the shaft extends.

Although not necessarily limited thereto, the invention is disclosed as applied to a vertical crank shaft internal combustion engine wherein the crank shaft is journaled in a bearing at the lower end of the crank case, and it is desired that the lubricating oil for this bearing be prevented from flowing down the shaft and interfering with operation of other equipment such as an electric generator or other device directly coupled to the crank shaft below the engine. The invention provides means for collecting and directing the flow of oil escaping from the bearing in the form of stationary oil drain collector housing which may be secured to the engine crank case, and an oil seal ring which substantially seals the crank shaft to this housing but is itself lubricated by a small portion of the oil draining from the bearing, which oil portion flows past the seal ring and is centrifugally discharged outwardly into the collector housing for simultaneous drainage therefrom of this portion along with the aforementioned main quantity of drainage oil.

For a complete description of the means for carrying out this and other desired results of the invention reference is now made to the drawings wherein.

Figure 1:
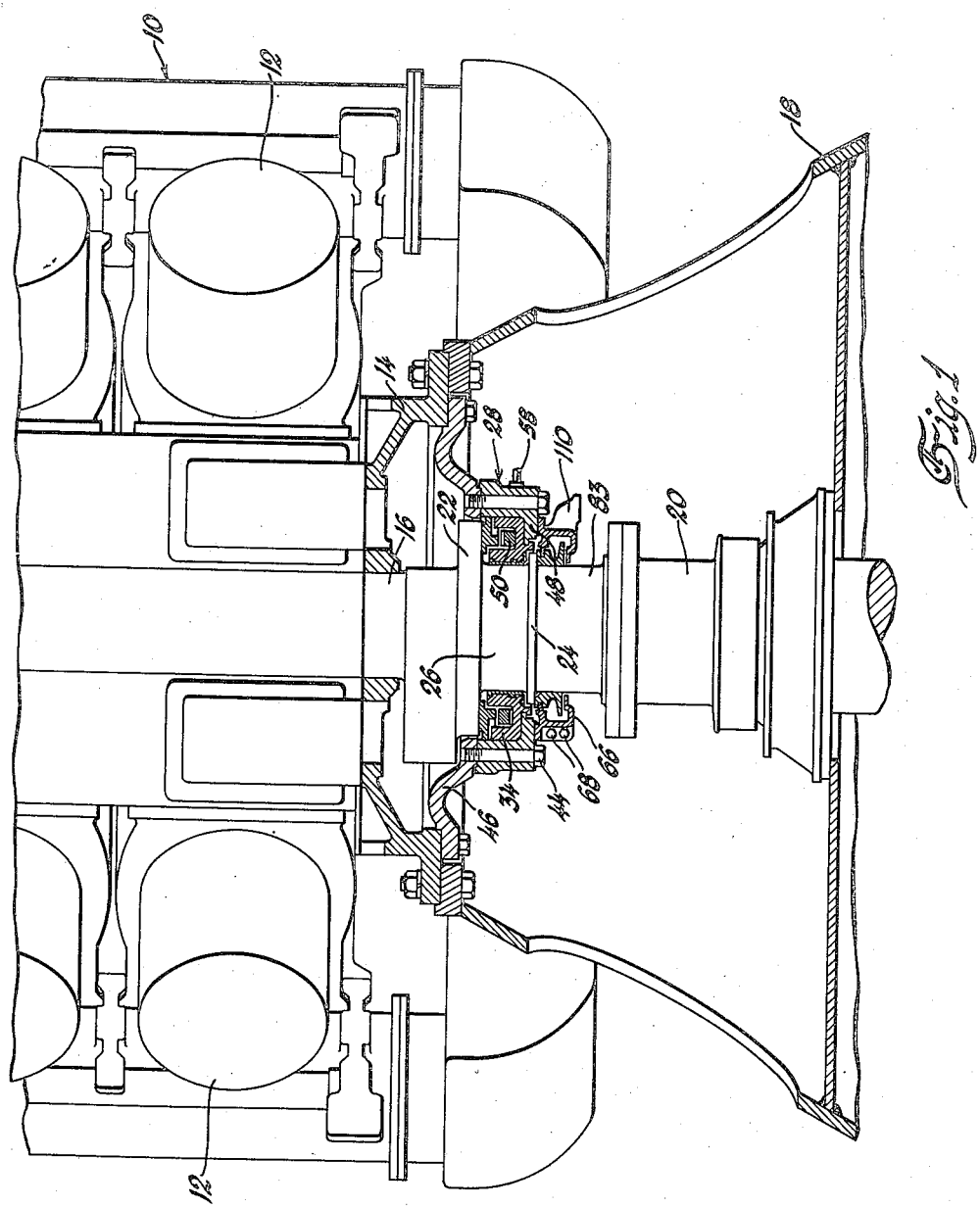
Figure 1 is a longitudinal sectional view of the device of this invention as applied to the lower end of a vertical crank shaft internal combustion engine, incorporating a crank shaft bearing, the drainage of lubricating oil from which is to be prevented from being carried further downwardly along the crank shaft to a driven machine below.

In Figure 1 the numeral 10 designates generally an internal combustion engine of the multi-row radial type having a plurality of cylinder units 12 about a crank case 14 through which extends the engine crank shaft 16. As shown, the engine is supported on a frusto-conical base 18 whose upper end bolts or is otherwise secured to the lower end of the engine crank case 14 and the crank shaft or an extension 20 thereof is coupled to an electric generator or other device (not shown). The portion of the crank shaft which extends out through the lower end of the crank case is shown provided with longitudinally spaced thrust flanges 22 and 24 at opposite ends of a journal 26 concentric with the crank shaft axis. The numeral 28 designates generally a Kingsbury type bearing which supports this lower end of the crank shaft both radially and in thrust in the usual manner well known in the art.

Figure 2:
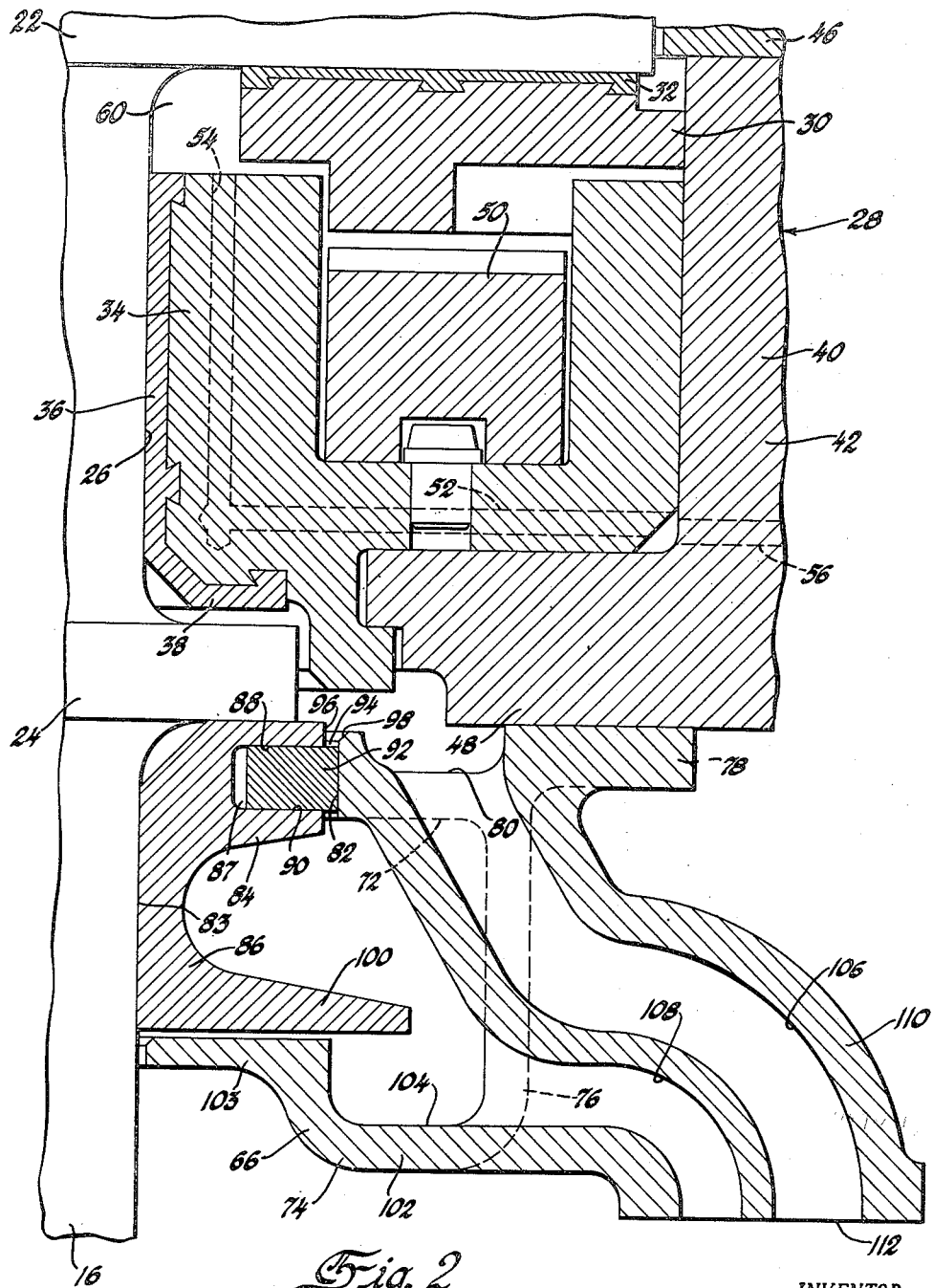
Figure 2 is an enlarged fragmentary view similar to Figure 1, showing certain parts in greater detail.

Although the details of this bearing 28 and its means of mounting to the engine do not form an essential part of the present invention, it will be seen on reference to Figure 2 that this bearing comprises a thrust bearing block 30 whose upper surface 32 abuts the underside of the crank shaft flange 22, and radial bearing block 34 of U-shaped section whose inner and lower surfaces 36 and 38 face the crank shaft journal 26 and upper surface of the flange 24 respectively. The bearing blocks 30 and 34 are each arranged in segments of an annular whole whereby they may be assembled about the crank shaft and are retained in place by a split annular carrier 40 of generally L-shaped section whose vertical legs 42 are bolted as at 44 (Fig. 1) to a bearing support plate 46, and whose horizontal leg 48 underlies the block 34. Disposed within the U-shaped block 34 is an annular spacer member 50, also segmental in form, on which rest the segmental sections of the thrust bearing block 30.

As is usual with this type bearing a direct oil circulating means therefor is provided. This is shown in the form of connecting drilled oil passages 52 and 54 extending through the base and inner vertical leg of the block 34 respectively. Connecting with the passage 52 is a passage 56 extending radially through the bearing carrier member 40 from an oil inlet boss 58 (Fig. 1) which is connected by means (not shown) to a suitable source of lubricating oil under pressure. The lubricating oil thus supplied is conducted to the annular space 60 at the juncture of the crank shaft flange 22 and journal above the bearing surfaces 36 and 38 and inboard of the bearing surfaces 32. There is a substantial rate of drainage of oil from the bearing, and to collect this drainage oil for subsequent return to its source, and to prevent the oil from escaping downwardly along the crank shaft, there is provided the structure now to be described.

An annular oil collector housing 66, formed in two halves with abutting ends bolted together as at 68 surrounds the crank shaft below the flange 24 and is secured as by bolts (not shown) to the bottom of the bearing carrier 40. This housing 66 is of inwardly presenting generally C-shaped section having an upper wall 72 and lower wall 74 connected by a cylindrical wall 76. Wall 76 extends somewhat above the upper wall 72 and terminates in an out-turned flange 78 by which the housing is fixed to the bearing carrier 40. The flange 78 is thus upwardly offset from the upper wall 72, providing an annular upwardly open trough 80 to receive the main portion of the oil draining from the bearing 28 above. The upper wall 72 terminates inwardly toward the crank shaft in a cylindrical seating surface 82 of a predetermined diameter.

Fixed in any suitable manner to the cylindrical surface 83 of the crank shaft below the flange 24 is a member 86 having a generally C-shaped section as shown, whose upper leg is provided with an annular groove 87 of predetermined width. Arranged within this groove 87 so as to have a "creep" fit on the side walls 88 and 90 thereof and also on the cylindrical seat 82 of the housing upper wall 72, is an accurately machined ring 92. For purposes of assembly and removal this ring 92 is formed in two diametrically split halves. The material of the ring 92 may be variously selected, it having been found that steel is suitable therefor. While the ring 92 is intended to effect a certain amount of sealing against the escape of oil past the ring seating surface 82, in order that this surface 82 and the sides 88 and 90 of the ring groove 87 will not be subjected to appreciable wear during engine operation, a small portion of the drain oil from the bearing 28 is desired to escape between the ring and these surfaces for purposes of their lubrication. To insure an ample supply of oil being available for this purpose the upper wall 72 is flanged upwardly at its inner margin so that the cylindrical surface 82 thereof may extend slightly above the ring 92 a short distance to form a small channel 94, the walls of which are defined by the cylindrical surface 82, the upper surface of the ring 92 and the outer face 96 of the member 86. To further improve the access of drain oil to this trough 94 the upper marginal edge of the cylindrical surface 82 is chamfered as at 98.

The lower leg 100 of the member 86 overlies the lower wall 74 of the housing 66 and acts as an oil slinger for the portion of the drain oil which passes the sealing ring 92. The lower wall 74 has its radially outer portion 102 offset below the inner portion 103 thereof whereby an upwardly presenting trough 104 is formed to collect oil thrown off by the oil slinger 100.

Cored passages 106 and 108 are provided through the upper and outer walls 72 and 76 at one side of the collector housing 66 for separately conducting the drain oil from the troughs 80 and 104 respectively. These passages extend outwardly of the housing 66 through an elbow-like boss 110 to an outlet 112 below the trough 104. The boss serves as a fitting to which a connecting hose or other means (not shown) may be attached for returning the oil to its source of supply.

There is thus disclosed a novel arrangement for sealing the vertical shaft of an engine or equivalent device against the escape of lubricating oil, and particularly such a sealing arrangement adapted to be disposed below a bearing for the shaft, which bearing requires a copious supply of lubricating oil with attendant large oil drainage. While the invention has been disclosed and described in its specific application to the sealing of oil drainage from a Kingsbury type thrust bearing associated with the crank shaft of an internal combustion engine, the scope of the invention is not to be limited other than as defined by the claims which follow.

I claim:

1. The combination with a generally vertically disposed rotary shaft and a casing adapted to receive a continuous supply of liquid having a bottom wall with an opening through which the shaft extends and the liquid drains, of means for collecting said drainage liquid and sealing against the escape of liquid along the shaft, said means comprising an annular housing surrounding the shaft below said opening, said housing being of inwardly presenting generally C-shape in radial section with the upper wall of the C terminating with an annular internal seating surface facing the shaft, a ring slidably fitting said seating surface, and means fixedly associated with the shaft providing an outwardly presenting annular groove slidably receiving said ring and a slinger flange extending into said housing, said housing having separate drain passages leading outwardly thereof from the upper surface of said upper wall and from the housing interior.

2. In combination, a vertically rotating shaft, a device surrounding the shaft from which liquid tends to drain downward along the surface of the shaft, and means below said device for collecting said drainage liquid and preventing its further downward passage along the shaft surface, said means comprising a fixed upwardly open annular trough for receiving all but a small portion of said drainage liquid and having its inboard wall provided with a sealing surface concentric with and facing the shaft, a ring having an annular outer peripheral surface in "creep" fitting engagement with said trough surface, an annular member tightly surrounding the shaft and rotatable therewith having an outwardly presenting peripheral groove with upper and lower wall surfaces in "creep" fitting engagement with the top and bottom surfaces of said ring, the "creep" fit of said ring on said trough and groove surfaces providing for the passage of said small portion of drainage liquid between said trough and member for the purpose of lubricating said ring, a second upwardly open trough surrounding the shaft below said member for receiving said small liquid drainage portion and having its outboard wall terminating above the upper extremities of its inboard wall, a slinger fixed to the shaft and terminating laterally thereof beyond said last named inboard wall and below the upper extremities of said outboard wall, and separate drain passageways leading from the respective troughs to a point below the bottom of said lower trough.

3. In a device for collecting drainage liquid and sealing against the flow of said liquid along a vertically rotating shaft, a housing rotatably receiving the shaft and provided with upper and lower upwardly open annular troughs, means surrounded by the inboard wall of said upper trough for directing all but a small portion of said drainage liquid into the upper trough while providing for the passage of said small portion into the lower trough, said means comprising a ring having a predetermined fit with the inboard surface of said inboard wall and an annular member axially rotatable relative to the housing and provided with an outwardly open peripheral groove having a predetermined fit with the top and bottom surfaces of said ring, said housing having an outlet below the bottom of said lower trough, and separate passageways leading from the bottoms of said troughs to said outlet.

4. The invention of claim 3, wherein said inboard wall and said annular member cooperate to define an upwardly open annular channel immediately above the ring.

5. In combination with a vertically rotating shaft and a thrust bearing therefor below which the shaft extends, a casing surrounding the bearing and having a bottom wall provided with an opening surrounding the shaft through which oil for lubricating the bearing is permitted to drain, means for collecting and directing said drainage oil and for preventing the escape of oil downward along the surface of the shaft, said means comprising an annular housing surrounding the shaft and fixed to said casing, said housing having upper and lower upwardly open annular troughs for receiving said drainage oil, said upper trough having its inboard wall concentric with and spaced from the shaft, a seal ring embraced by and having a slight diametral clearance with the inboard surface of said inboard wall, a member rotatable with the crank shaft having an outer peripheral groove embracing the top and bottom surfaces of said ring, said member terminating outwardly of the shaft in radially spaced relation with said inboard wall surface to form an upwardly open annular channel for passage of drainage oil to the top of said ring, said housing having an outlet below the bottom of said lower trough, and separate oil drain passageways connecting said outlet with the bottoms of said respective troughs.

6. The invention of claim 5 together with an oil slinger rotatable with the crank shaft and extending into said housing below said ring.

7. In a device for collecting drainage oil and sealing against the flow of said oil along a vertically rotating shaft, an annular housing of inwardly presenting generally C-shape in radial section having the upper wall of the C terminating with an annular internal seating surface, a ring slidably fitting said seating surface and an annular member axially rotatable relative to the housing and provided with an outwardly open peripheral groove slidably receiving said ring, said housing having an outlet below the bottom interior wall of the housing, and separate oil drain passageways leading to said outlet from the upper surface of said upper wall and the interior of the housing respectively.

8. In a device for collecting drainage liquid and sealing against the flow of said liquid along a vertically rotating shaft, a housing having an annular ring seating surface facing the shaft and an upwardly presenting first trough surrounding said seating surface, a ring slidably fitting said seating surface, and an annular member rotatably carried by the shaft having an outwardly presenting peripheral groove slidably receiving said ring, said housing having a wall forming a second trough below said ring and an outlet, and separate liquid drain passageways leading from said first and second troughs to said outlet.

WILLIAM E. BRILL.

References Cited in the file of this patent

UNITED STATES PATENTS

| Number | Name | Date |
|---|---|---|
| 884,477 | Emmet et al. | Apr. 14, 1908 |